(12) United States Patent
Pan et al.

(10) Patent No.: US 9,920,483 B2
(45) Date of Patent: Mar. 20, 2018

(54) COPOLYMER DISPERSIONS AND THEIR USE IN PAPER-COATING FORMULATIONS

(71) Applicant: CELANESE SALES GERMANY GMBH, Sulzbach (Taunus) (DE)

(72) Inventors: Yanzhong Pan, Brussels (BE); Cristiana Licheri, Eltville am Rhein (DE); Nancy Coulson, Cincinnati, OH (US)

(73) Assignee: CELANESE SALES GERMANY GMBH, Sulzbach (Taunus) (DE)

(*) Notice: Subject to any disclaimer, the term of this patent is extended or adjusted under 35 U.S.C. 154(b) by 160 days.

(21) Appl. No.: 14/898,880

(22) PCT Filed: Jun. 12, 2014

(86) PCT No.: PCT/US2014/042115
§ 371 (c)(1),
(2) Date: Dec. 16, 2015

(87) PCT Pub. No.: WO2014/204777
PCT Pub. Date: Dec. 24, 2014

(65) Prior Publication Data
US 2016/0153148 A1    Jun. 2, 2016

Related U.S. Application Data

(60) Provisional application No. 61/836,293, filed on Jun. 18, 2013.

(51) Int. Cl.
| | |
|---|---|
| *C08L 31/04* | (2006.01) |
| *D21H 19/28* | (2006.01) |
| *D21H 19/58* | (2006.01) |
| *C08F 218/08* | (2006.01) |

(52) U.S. Cl.
CPC ........... *D21H 19/28* (2013.01); *C08F 218/08* (2013.01); *C08L 31/04* (2013.01); *D21H 19/58* (2013.01); *C08L 2201/54* (2013.01)

(58) Field of Classification Search
CPC ...................................................... C08L 31/04
See application file for complete search history.

(56) References Cited

U.S. PATENT DOCUMENTS

| | | | |
|---|---|---|---|
| 4,395,499 A | 7/1983 | Rosenski et al. | |
| 4,503,185 A | 5/1985 | Hausman et al. | |
| 6,624,243 B2* | 9/2003 | Stark | C08F 230/08 524/806 |
| 2001/0024644 A1* | 9/2001 | Kohlhammer | C04B 24/2641 424/78.19 |
| 2011/0045287 A1 | 2/2011 | Kawashima et al. | |
| 2012/0174474 A1 | 7/2012 | Dondjaja et al. | |

FOREIGN PATENT DOCUMENTS

WO    2011139267    11/2011

OTHER PUBLICATIONS

International Search Report and Written Opinion issued in a corresponding application PCT/US2014/042115 dated Jan. 7, 2015.

* cited by examiner

*Primary Examiner* — Kuo-Liang Peng
(74) *Attorney, Agent, or Firm* — Roberts Mlotkowski Safran Cole & Calderon P.C.

(57) ABSTRACT

The invention relates to copolymer dispersions, comprising: a copolymer of (a) a vinyl ester of an alkanoic acid having from 1 to 13 carbon atoms; (b) ethylene; (c) from 0.5 to 5 pphm of a first cross-linking co-monomer comprising an ethylenically unsaturated monomer comprising an epoxy group; and (d) from 0.55 to 2 pphm of a second functional co-monomer comprising an ethylenically unsaturated dicarboxylic acid, mono- or di-ester thereof or anhydride thereof wherein the copolymer is dispersed in an aqueous medium comprising a stabilizer. The dispersions advantageously provide surprisingly good adhesion characteristics to paper substrates.

29 Claims, No Drawings

COPOLYMER DISPERSIONS AND THEIR USE IN PAPER-COATING FORMULATIONS

CROSS-REFERENCE TO RELATED APPLICATIONS

The present application is a U.S. National Phase of PCT/US2014/042115 filed on Jun. 12, 2014 claiming priority to U.S. provisional application No. 61/836,293 filed Jun. 18, 2013. The disclosure of the PCT Application is hereby incorporated by reference into the present Application.

FIELD OF THE INVENTION

The present invention relates to copolymer dispersions comprising vinyl ester/ethylene copolymers and their use in paper coating formulations.

BACKGROUND OF THE INVENTION

Pigmented paper coating formulations generally comprise an aqueous synthetic polymer binder dispersion and pigment and may contain other additives typically used in the paper coating art. Illustrative of the polymer binders in the dispersions are vinyl acetate copolymers and interpolymers, including vinyl acetate/ethylene (VAE) and vinyl acetate/alkyl acrylate copolymers and interpolymers, and styrene/butadiene styrene/acrylate copolymers. Such copolymers and interpolymers can also contain other co-monomers such as, for example, a copolymerized ethylenically unsaturated mono- or dicarboxylic acid or other unsaturated co-monomers which can function as cross-linking agents.

U.S. Pat. No. 4,395,499, for example, discloses high strength pigment binders for paper coatings having increased water retention and stability. The coating compositions contain an aqueous synthetic polymer latex comprising a dispersed interpolymer of a vinyl ester; a polyethylenically unsaturated co-monomer which can be triallyl cyanurate, triallyl isocyanurate, diallyl maleate, diallyl fumarate, divinyl benzene or diallyl phthalate; an ethylenically unsaturated mono- or dicarboxylic acid co-monomer or half ester thereof; and optionally an alkyl acrylate co-monomer.

In addition, U.S. Pat. No. 4,503,185 discloses aqueous vinyl ester/ethylene emulsion copolymers demonstrating enhanced dry pick strength and gloss in paper coating formulations. The copolymers comprise a vinyl ester/ethylene copolymer colloidally dispersed in an aqueous medium, the copolymer consisting essentially of (a) a vinyl ester of a $C_1$-$C_{12}$ alkanoic acid, (b) about 0.5 to 15 wt % ethylene, (c) 0.1 to 10 wt % of an ethylenically unsaturated $C_3$-$C_{10}$ mono- or dicarboxylic acid or half ester of such dicarboxylic acid with a $C_1$-$C_{18}$ alkanol, (d) 0.05 to 10 wt % of a dicyclopentadienyl acrylate, and (e) 0-50 wt % of an alkyl acrylate.

Notwithstanding the availability of these various types of paper coating binder dispersions, there is a persistent need for coated paper and coated paperbord producers to identify paper coating dispersions (i.e., paper coating binders) that provide, when used in paper coating compositions, increased binding strength when the compositions are applied to paper and paperboard products. Most often, binding strength is quantified by a paper test called the IGT pick strength test.

Evaluation of the picking effect exhibited by selected paper substrates coated with any given type of paper coating composition can be used to quantify the binding strength and coating performance of that composition. Picking evaluation is carried out by means of IGT pick testing according to standard methods of measurement by the Technical Association of the Pulp and Paper Industry (TAPPI) as well known in the art and incorporated herein by reference. A measure of dry binding strength is provided by the IGT dry pick test pursuant to TAPPI Useful Method UM 591, Surface Strength of Paper, the entirety of which is incorporated herein by reference. The IGT dry pick strength measures the speed, in cm/sec, required to lift the paper coating off of the surface of a paper substrate strip when printed using an ink roller and standard conditions as described in UM 591. Higher IGT dry pick numbers indicate better resistance of the coated substrate to picking and hence higher strength coating performance. Wet binding strength may be measured according to the IGT wet pick test, in which the wet binding strength is evaluated after the paper is wetted. An IGT damping unit includes a damping disc with doctor blade and a printing disk. The damping unit and doctor blade are used to apply a thin and consist amount of water to the paper substrate which is then printed with a standard IGT ink. After the ink is allowed to dry for 30 minutes, a densitometer is used to measure the density of the ink on the non-wetted printed surface and compared to that of the ink density on the pre-wetted and printed surface. The formula used for determining IGT wet pick is:

$$\frac{\text{Density of } Nonwetted \text{ Surface} - \text{Density of Wetted Surface}}{\text{Density of } Nonwetted \text{ Surface}} \times 100 = IGT \text{ Wet Pick Value}$$

Lower IGT wet pick numbers indicate better resistance of the coated substrate to picking and hence higher strength coating performance. A higher value indicated more wet pick.

A variety of emulsion polymerization components and techniques can influence binding strength, but, in general, vinyl ester-based binders (e.g., polyvinyl acetate, vinyl acetate-ethylene, vinyl acetate-acrylate, and the vinyl acetate-based binders discussed above) are known to provide lower binding strength than more commonly used coating binders like styrene butadiene (SB) and styrene acrylics. To compensate for the lower IGT pick resistance provided by paper coating compositions using such vinyl ester based binders, higher binder levels are typically required, which, of course, negatively impacts profitability of the coated paper and paperboard products made with these types of coating binders. In addition, high binder levels may result in adverse properties, e.g., reduced ink absorption.

A need therefore exists for vinyl ester-based copolymer dispersions that exhibit improved binding strength characteristics particularly when used in paper coating formulations.

SUMMARY OF THE INVENTION

It has now been discovered that using vinyl acetate/ethylene (VAE) dispersions containing certain other co-monomers, latex binders may be prepared having especially desirable physical properties, such as good dry and/or wet pick strength. Such latex binders are desirable because they can be used to provide especially effective and environmentally friendly coating compositions for paper and paperboard applications.

Accordingly, in one embodiment, the invention is a copolymer dispersion, comprising a copolymer of a vinyl ester of an alkanoic acid having from 1 to 13 carbon atoms, ethylene, from 0.5 to 5 pphm of a first cross-linking co-monomer (also referred to herein as the "first co-monomer") comprising an ethylenically unsaturated monomer comprising an epoxy group, and from 0.55 to 2 pphm, e.g., from 0.75 to 1.25 pphm, of a second functional co-monomer (also referred to herein as the "second co-monomer") comprising an ethylenically unsaturated dicarboxylic acid, mono- or di-ester thereof or anhydride thereof. As used herein, the term "pphm" refers to parts per hundred main monomer, i.e., parts per hundred of the vinyl ester of the alkanoic acid and ethylene. The copolymer is dispersed in an aqueous medium comprising a stabilizer, preferably a surfactant.

In another embodiment, the invention is a copolymer dispersion, comprising a copolymer of a vinyl ester of an alkanoic acid having from 1 to 13 carbon atoms, ethylene, from 1.7 to 5 pphm, e.g., from 2 to 4 pphm, of a first cross-linking co-monomer comprising an ethylenically unsaturated monomer comprising an epoxy group, and from 0.1 to 2 pphm, e.g., from 0.75 to 1.25 pphm, of a second functional co-monomer comprising an ethylenically unsaturated dicarboxylic acid, mono- or di-ester thereof or anhydride thereof. The copolymer is dispersed in an aqueous medium comprising a stabilizer, preferably a surfactant.

In yet another embodiment, the invention is a copolymer dispersion, comprising a copolymer of a vinyl ester of an alkanoic acid having from 1 to 13 carbon atoms, ethylene, a first cross-linking co-monomer comprising an ethylenically unsaturated monomer comprising an epoxy group, and a second functional co-monomer comprising an ethylenically unsaturated dicarboxylic acid, mono- or di-ester thereof or anhydride thereof. The copolymer is dispersed in an aqueous medium comprising a stabilizer, preferably a surfactant. The copolymer has an average particle size greater than 80 nm and less than 260 nm, e.g., greater than 80 nm and less than 220 nm, as determined by laser aerosol spectroscopy.

In a further embodiment, the invention is a paper coating composition comprising any of the copolymer dispersions described herein and one or more pigments. The pigment may be selected from the group consisting of clay, calcium carbonate, titanium dioxide, plastic pigments and combinations thereof.

In yet a further embodiment, the invention is a process of producing a copolymer dispersion, the process comprising providing an aqueous mixture comprising (i) a vinyl ester of an alkanoic acid having from 1 to 13 carbon atoms; (ii) ethylene; (iii) a first cross-linking co-monomer comprising an ethylenically unsaturated monomer comprising an epoxy group; and (iv) a second functional co-monomer comprising an ethylenically unsaturated dicarboxylic acid, mono- or di-ester thereof or anhydride thereof. The aqueous mixture further comprises a stabilizer, preferably a surfactant. In this aspect, the first cross-linking co-monomer is present in an amount from 0.5 to 5 pphm and the second functional co-monomer is present in an amount from 0.55 to 2 pphm, e.g., from 0.75 to 1.25 pphm. Alternatively, the first cross-linking co-monomer is present in an amount from 1.7 to 5 pphm e.g., from 2 to 4 pphm, and the second functional co-monomer is present in an amount from 0.1 to 2 pphm, e.g., from 0.75 to 1.25 pphm. The process further comprises emulsion polymerizing the aqueous mixture to form the copolymer dispersion.

The above-described process may be run as a batch, semi-batch, or continuous process with periodic or continuous addition of one or more of the monomers during the polymerization process. For example, in some aspects, an initial charge of the vinyl ester and ethylene is made, followed by subsequent charges of additional vinyl ester and/or ethylene. The first and second copolymers may be charged, together or separately, with the initial charge and/or in subsequent charging steps.

DETAILED DESCRIPTION OF THE INVENTION

The present invention relates to aqueous, stabilized, copolymer dispersions that demonstrate excellent pick strength when such dispersions are incorporated into coating compositions, and in particular into coating compositions for paper products. The primary copolymer contained in the dispersions of the present invention is a copolymer formed at least from a vinyl ester monomer, ethylene, and at least two cross-linking co-monomers. The at least two cross-linking co-monomers comprise a first cross-linking co-monomer comprising an ethylenically unsaturated monomer comprising an epoxy group and a second functional co-monomer comprising an ethylenically unsaturated dicarboxylic acid, mono- or di-ester thereof, or anhydride thereof. The copolymer is dispersed in an aqueous medium comprising a stabilizer, preferably a surfactant stabilizer. The dispersion may be formulated, with a pigment and/or filler, for example, into a coating composition for coating paper or paperboard substrates. Substrates coated with the inventive coating compositions advantageously have particularly strong picking characteristics, exhibiting high IGT dry and wet pick values, rendering them particularly well suited for paper and paperboard coating applications.

Exemplary vinyl ester monomers for forming the copolymer include vinyl acetate, vinyl formate, vinyl propionate, vinyl butyrate, vinyl isobutyrate, vinyl valerate, vinyl-2-ethyl-hexanoate, vinyl isooctanoate, vinyl nonate, vinyl decanoate, vinyl pivalate, vinyl versatate, and mixtures thereof. In particular, vinyl acetate is readily availability and low cost. The vinyl ester may be present in the copolymer in an amount ranging from 70 to 95 pphm, e.g., from 75 to 85 pphm or from 78 pphm to 82 pphm.

Generally, increased ethylene content in the copolymer will decrease the glass transition temperature (Tg) of the resulting copolymer. The copolymer preferably comprises ethylene in an amount from 5 pphm to 30 pphm, e.g., from 10 to 25 pphm, from 18 to 22 pphm or from 8 to 16 pphm.

As indicated above, the first cross-linking co-monomer comprises an ethylenically unsaturated monomer comprising an epoxy group. Examples include allyl glycidyl ether, methacryloyl glycidyl ether, butadiene monoepoxides, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxypropyl)acrylamide, N-(2,3-epoxypropyl)methacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidyloxymethylacrylamide, N-glycidyloxypropylmethacrylamide, N-glycidyloxyethylacrylamide, N-glycidyloxyethylmethacrylamide, N-glycidyloxypropylacrylamide, N-glycidyloxypropylmethacrylamide, N-glycidyloxybutylacrylamide, N-glycidyloxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl(2,3-epoxypropyl)ammonium chloride, methacrylamidopropyldimethyl(2,3-epoxypropyl) ammonium chloride, and glycidyl methacrylate.

The second functional co-monomer comprises an ethylenically unsaturated dicarboxylic acid, a mono- or di-ester thereof or an anhydride thereof. Examples include itaconic acid, maleic acid, citraconic acid, mesaconic acid, fumaric acid, and the $C_4$-$C_8$ alkyl mono- or di-esters of itaconic acid, maleic acid, citraconic acid, mesaconic acid, or fumaric acid, itaconic anhydride, maleic anhydride, citraconic anhydride, mesaconic anhydride, or fumaric anhydride.

The first and second co-monomers may be present in amounts relative to each other to impart to the copolymer dispersion and in the coating composition containing the copolymer dispersion, e.g., paper coating composition, as hereinafter described, the desired IGT pick characteristics. In one embodiment, the copolymer comprises the first cross-linking co-monomer in an amount from 0.5 to 5 pphm, e.g., from 1.7 to 3 pphm, and the second functional comonomer in an amount from 0.55 to 2 pphm, e.g., from 0.75 to 1.25 pphm. In another embodiment, the copolymer comprises the first cross-linking co-monomer in an amount from 1.7 to 5 pphm, e.g., from 1.7 to 3 pphm, and the second functional comonomer in an amount from 0.1 to 2 pphm, e.g., from 0.75 to 1.25 pphm.

The copolymers described herein may include monomer units derived from monomers in addition to the vinyl ester, ethylene, and first and second co-monomers. Additional monomers useful for optionally being incorporated into the presently disclosed copolymer dispersions include those that contain at least one polymerizable double bond along with one or more additional functional moieties (i.e., a functionalizing co-monomer). Suitable auxiliary co-monomers include unsaturated organic acids, unsaturated silanes, ureido co-monomers, co-monomers with crosslinkable functions, and combinations thereof.

Suitable auxiliary co-monomers including unsaturated organic acids include ethylenically unsaturated carboxylic acids and the anhydrides and amides thereof, ethylenically unsaturated sulfonic acids, and ethylenically unsaturated phosphonic acids.

For example, the auxiliary monomer may comprise an ethylenically unsaturated $C_3$-$C_8$ monocarboxylic acid together with the anhydrides or amides thereof. Examples of suitable ethylenically unsaturated $C_3$-$C_8$ monocarboxylic acids include acrylic acid, methacrylic acid and crotonic acid.

Examples of suitable ethylenically unsaturated sulfonic acids include those having 2-8 carbon atoms, such as vinylsulfonic acid, sodium vinyl sulfonate, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid. Examples of suitable ethylenically unsaturated phosphonic acids also include those having 2-8 carbon atoms, such as vinylphosphonic acid and ethylenically unsaturated polyethoxyalkyletherphosphates.

In one embodiment, the copolymer includes a cross-linking co-monomer selected from ethylenically unsaturated silane compounds. Exemplary ethylenically unsaturated silane co-monomers are disclosed, for example, in PCT Publ. WO 2011/139267. This co-monomer can generally correspond to a substituted silane of the structural Formula I:

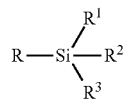

in which R denotes an organic radical olefinically unsaturated in the ω-position and $R^1$ $R^2$ and $R^3$ which may be identical or different, denote halogen, chlorine, or the group —OZ, Z denoting hydrogen or primary or secondary alkyl or acyl radicals optionally substituted by alkoxy groups.

Suitable unsaturated silane compounds of the Formula I include those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols carrying the Si group of up to 6 carbon atoms. Suitable radicals $R^1$, $R^2$, $R^3$ may be the group —OZ, Z representing primary and/or secondary alkyl radicals of up to 10 carbon atoms, for example, up to 4 carbon atoms, or alkyl radicals substituted by alkoxy groups, for example, of up to 3 carbon atoms, or acyl radicals of up to 6 carbon atoms, for example, of up to 3 carbon atoms, or hydrogen. Exemplary unsaturated silane co-monomers include vinyl trialkoxy silanes.

Exemplary silane compounds of the Formula I include vinyltrichlorosilane, vinylmethyldichlorosilane, γ-methacryloxypropyltris(2-methoxyethoxy)silane, vinylmethoxysilane, vinyltrimethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

The amounts of the aforementioned optional comonomers may vary widely, but in exemplary embodiments, such comonomers may be present in the copolymer in an amount from 0 to 1, from 0.2 to 1 or from 0.2 to 0.6 pphm.

In one aspect, the copolymer dispersion and resulting coating composition of the invention comprise one or more external cross-linkers. Suitable external cross-linkers include carbonates such as ammonium zirconium carbonate (AZC) and potassium zirconium carbonate (KZC). If present, the external cross-linker may be present in the dispersion in an amount from 0.1 to 10 wt. %, e.g., from 0.5 to 5 wt. %, based on the total weight of the dispersion.

Copolymer Dispersion Preparation

Procedures for forming copolymer dispersions are generally described, for example, in U.S. Pat. No. 5,849,389, the entirety of which is incorporated herein by reference, as well as in Chorng-Shyan Chern, *Principles and Applications of Emulsion Polymerization*, John Wiley and Sons Inc. (2008), the entirety of which is incorporated herein by reference.

In forming the dispersions of the present invention, the respective monomers can be polymerized in an aqueous medium under pressures not more than 150 bar, preferably not more than 120 bar or not more than 100 bar, in the presence of a catalyst and at least one emulsifying agent. The aqueous system can be maintained by a suitable buffering agent at a pH of from 2 to 6 or from 4 to 6, with the catalyst being added incrementally or continuously. For the dispersion, vinyl acetate and 50% to 75% of the other co-monomers can be suspended in water and thoroughly agitated in the presence of ethylene under the working pressure to effect solution of the ethylene in the mixture up to the substantial limit of its solubility under the conditions existing in the reaction zone. The vinyl acetate, the first and second co-monomers, and any other co-monomers can then be gradually heated to polymerization temperature. The resulting latex of the invention may be free of, or substantially free of, colloidal stabilizers such as polyvinyl alcohol, optionally comprising less than 1.5 pphm polyvinyl alcohol, less than 1 pphm polyvinyl alcohol, or less than 0.5 pphm polyvinyl alcohol, or optionally less than 1 wt. % polyvinyl alcohol, or less than 0.5 wt. % polyvinyl alcohol, based on the total weight of the monomers. The co-polymerization process may be run as a batch, semi-batch, or continuous process with periodic or continuous addition of one or more of the monomers during the polymerization process.

In some aspects, an initial charge of the vinyl ester and ethylene is made, followed by subsequent periodic charges of additional vinyl ester and/or ethylene. The first and second co-monomers may be charged, together or separately, with the initial charge and/or in subsequent charging steps, although it is preferred that the second functional co-monomer is added shortly after polymerization has begun. Thus, in one aspect, an initial charge comprising the vinyl ester, ethylene and optionally the first cross-linking co-monomer is made, followed by subsequent addition of the second functional co-monomer, and optionally subsequent addition of additional vinyl ester, additional ethylene and optionally additional first cross-linking co-monomer and/or second functional co-monomer. Thus, in some embodiments, one or more of the vinyl ester, ethylene, first cross-linking co-monomer and/or second functional co-monomer are added periodically to a reaction vessel to form the aforementioned aqueous mixture. The mixture may be heated, e.g., to a temperature from 65 to 75° C., prior to further addition of one or more of additional vinyl ester, ethylene, and optionally the first and/or second co-monomer. When the temperature reaches a temperature from 65° C. to 75° C., e.g., 70° C., catalyst may be slowly added over a period of, for example, from 270 to 390 minutes, e.g., about 330 minutes.

After the start of the polymerization, additional ethylene may be added while maintaining the pressure in the reactor at about 35 to 45 Bar, e.g., about 40 Bar. A monomer mixture containing additional vinyl ester (and optionally the first and/or second co-monomer) may be added for a period from 250 to 350 minutes, e.g., about 300 minutes. 15-35 minutes, e.g., about 25 minutes, after the start of the monomer mixture addition, additional first and/or second co-monomer may be slowly added for a period from 220 to 320 minutes, e.g., from 250 to 290 minutes or about 270 minutes. After all additions are completed, the temperature may be held at from 65 to 79° C., e.g., 72° C., for an additional 20 to 60 minutes, preferably 20 to 40 minutes or about 30 minutes.

The catalyst, which comprises a main catalyst or initiator, and may include an activator, also may be added incrementally or continuously together with the remaining co-monomers, if any. The monomers employed may be added either as pure monomers or as a pre-emulsion.

Suitable polymerization catalysts include the water-soluble free-radical-formers generally used in emulsion polymerization, such as hydrogen peroxide, sodium persulfate, potassium persulfate and ammonium persulfate, as well as tert-butyl hydroperoxide, preferably in amounts between 0.01% and 3% by weight, for example, 0.01% and 1% by weight, based on the total weight of the dispersion. They can be used together with reducing agents such as sodium formaldehyde-sulfoxylate, ferrous salts, sodium dithionite, sodium hydrogen sulfite, sodium sulfite, sodium thiosulfate, as redox catalysts in amounts of 0.01% to 3% by weight, for example, 0.01% to 1% by weight, based on the total amount of the dispersion. The free-radical-formers can be charged in the aqueous emulsifier solution or can be added during the polymerization in doses. In one embodiment, the reducing agent Bruggolite FF6™ is employed in the polymerization process. FF6 comprises three sulfur-based reducing agents: (i) 2-Hydroxy-S-Sulfinatoacetic acid, di-sodium salt (50-60%); (ii) sodium sulfite (30-35%); and (iii) 2-Hydroxy-2-sulfonatoacetic acid, di-sodium salt (10-15%).

The manner of combining the polymerization ingredients can be by various known monomer feed methods, such as, continuous monomer addition, incremental monomer addition, or addition in a single charge of the entire amounts of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

The emulsion polymerization processes used to prepare the dispersion in aqueous latex form is carried out in the presence of a stabilization system which comprises one or more of certain types of anionic and/or nonionic surfactants as emulsifiers. Such emulsifiers are conventional and well known.

Suitable nonionic surfactants which can be used as emulsifiers in the emulsion stabilizing system of the coating compositions herein include polyoxyethylene condensates. As noted above, however, such ethoxylated nonionic surfactants used to stabilize the binder dispersions of the present invention optionally may not include ethoxylated nonionics based on alkylphenols. For purposes of this invention, such dispersions and coating compositions are considered to be substantially free of APEs if they contain less than 500 wppm of alkylphenol ethoxylates. In one embodiment, the dispersion or the resulting copolymer dispersion of the invention may comprise a minor amount of APEs. Exemplary polyoxyethylene condensates that can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

Nonionic surfactants that can be used also include a series of surface active agents available from BASF under the Pluronic™ and Tetronic™ trade names. Pluronic surfactants are ethylene oxide (EO)/Propylene oxide (PO)/ethylene oxide block copolymers that are prepared by the controlled addition of PO to the two hydroxyl groups of propylene glycol. EO is then added to sandwich this hydrophobe between two hydrophilic groups, controlled by length to constitute from 10% to 80% (w/w) of the final molecule. PO/EO/PO block copolymers also available under the trade name Pluronic and are prepared by adding EO to ethylene glycol to provide a hydrophile of designated molecular weight. PO is then added to obtain hydrophobic blocks on the outside of the molecule. Tetronic surfactants are tetra-functional block copolymers derived from the sequential addition of PO and EO to ethylene-diamine. Tetronic surfactants are produced by the sequential addition of EO and PO to ethylene-diamine. In addition, a series of ethylene oxide adducts of acetyleneic glycols, sold commercially by Air Products under the Surfynol™ trade name, are suitable as nonionic surfactants. Additional examples of nonionic surfactants include Disponil™ A 3065 (alcohol ethoxylate), Emulsogen™ EPN 407 (alkyl polyglycol ether with 40 EO), and Emulsogen™ EPN 287 (alkyl polyglycol ether with 28 EO).

Suitable anionic surfactants that can be used as emulsifiers in the binder latex components of the coating compositions, e.g., paper coating compositions, described herein include alkyl aryl sulfonates, alkali metal alkyl sulfates, sulfonated alkyl esters and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl sulfosuccinate and dioctyl sodiumsulfosuccinate. The surfactants are employed in amounts effective to achieve adequate emulsification of the polymer in the aqueous phase and to provide desired particle size and particle size distribution. Other ingredients known in the art to be useful for various specific purposes in emulsion polymerization, such as, acids, salts, chain transfer agents, and chelating agents, also may be employed in the preparation of the polymer. For example, if the polymerizable constituents include a monoethylenically unsaturated carboxylic acid monomer, polymerization under acidic conditions (pH 2 to 7, for example, 2 to 5) is preferred. In such instances the aqueous medium can include those known weak acids and their salts that are commonly used to provide a buffered system at the desired pH range. Following polymerization, the solids content of the resulting dispersion can be adjusted to the level desired by the addition of water or by the removal of water by distillation. Generally, the desired level of polymeric solids content is from about 40 wt. % to about 70 wt. % based on the total weight of the respective dispersion, from about 40 wt. % to about 60 wt. % or from about 45 to about 57 wt. %. Additional examples of anionic surfactants include Disponil™ SDS 15 (15% sodium dodecyl sulfate), Polystep™ A 16 (30% sodium dodecylbenzene sulfonate, branhed), Disponil™ FES 77 IS (32% sodium lauryl ether sulfate).

The particle size of the dispersion can be regulated by the quantity of non-ionic or anionic surfactants employed. To obtain smaller particles sizes, greater amounts of surfactants are used. As a general rule, the greater the amount of the surfactant employed, the smaller the average particle size. In exemplary embodiments, the copolymer has an average particle size greater than 80 and less than 260 nm, e.g., greater than 100 and less than 200 nm or greater than 120 and less than 180 nm, as determined by Laser Aerosol Spectroscopy.

Measurement of Particle Size

Particle size is determined via Laser Aerosol Spectroscopy. A Detailed description of the method is published in Dr. J. Paul Fischer, Kunstharz Nachrichten 28, "Characterization and quality assurance of polymer dispersions," October 1992. As laser source a Nd:YVO4 Laser (Millenia II), Spectra Physics with a power of 2 W and a wavelength of 532 nm is used. A bialkali photocathode type 4517 from Burle (former RCA) is used. Polymer particles are spray dried before entering the analyzer. Light scattered by the particles is registered in an angle of 40° C. and the signal is analyzed with a 1024 channel multi channel analyzer from TMCA.

For sample preparation, 0.2 ml of dispersion are diluted in highly purified water with a specific conductivity of 18.2 µS/m. The sample is sprayed via a Beckman nozzle and dried with nitrogen. The resulting single particles are neutralized by irradiation (Kr-85 source) and analyzed via the single particle scattering experiment. From the recorded data are calculated the number and weight average distribution curves in a rang from 80 to 550 nm as well as the corresponding average particle size diameters (dn, dw and dz as well as dw/dn).

Thus, in preferred embodiments, the process for producing the copolymer dispersions of the invention comprises providing an aqueous mixture comprising the aforementioned vinyl ester, ethylene, first and second co-monomers, and stabilizer; and emulsion polymerizing the aqueous mixture. As an optional step, a pre-emulsion can be formed. The monomer pre-emulsion may then be added after the start of the polymerization, and may be made by emulsifying, for example, vinyl acetate and glycidyl methacrylate in a solution of itaconic acid and an active solution of a fatty alcohol ethoxylates in demineralized water. Thermal or redox initiators may be used in the process, for example, in the pre-emulsion, as further detailed below.

The polymerization may be carried out in one, two or more stages using any known polymerization reactor system, such as a batch, loop, continuous, or cascade reactor system. For example, the process may be a semi-batch process, in which initiator and pre-emulsion monomer are continuously fed to a reactor, which may be pre-loaded with copolymer and stabilizer. In one embodiment, monomer and water may be fed separately to the reactor, to which ethylene is added at the beginning.

The polymerization temperature generally ranges from about 20° C. to about 150° C., for example, from about 50° C. to about 120° C., from about 65° C. to about 95° C., or from about 70° C. to about 75° C. The polymerization generally takes place under pressure if appropriate, for example, from about 2 to about 150 bar, from 50 to 120 bar or from about 5 to about 100 bar.

In a typical polymerization procedure, the vinyl ester monomer(s), stabilizing system and any other co-monomers are polymerized in an aqueous medium under pressures up to about 150 bar, up to 120 bar or up to 100 bar in the presence of the specified initiator(s). The aqueous reaction mixture in the polymerization vessel can be maintained by a suitable buffering agent, such as sodium acetate, at a pH of about 2 to about 7.

The manner of combining the several polymerization ingredients, i.e., stabilizing system, co-monomers, initiator system components, etc., can vary widely. In one embodiment, an aqueous starting medium containing at least part of the stabilizing system, any buffering agent, and any water soluble co-monomers, such as sodium vinyl sulfonate, can be initially formed in a polymerization vessel with the various other polymerization ingredients being added to the vessel thereafter. Any transition metal salts used as co-catalysts with redox-based initiators can be added to the aqueous starting medium.

Co-monomers can be added to the polymerization vessel continuously, incrementally or as a single charge addition of the entire amounts of co-monomers to be used. Co-monomers can be employed as pure monomers or can be used in the form of a pre-emulsion. When present, ethylene as a co-monomer can be pumped into the polymerization vessel and maintained under appropriate pressure therein.

It is possible for the total amount of initiator system to be added to the polymerization vessel at the beginning of the polymerization. However, a portion of the initiator can be included in the initial charge at the beginning, and the remainder can be added after the polymerization has been initiated, in one or more steps or continuously.

In one embodiment, a first portion, typically from about 5 to about 20 wt %, such as from about 8 to about 15 wt %, of each of the main and auxiliary co-monomers (other than any water soluble co-monomers already present) is added to the aqueous starting medium and the resulting mixture is stirred to form an emulsion. The emulsion is then heated towards a desired polymerization temperature and, during heating, a first portion of the initiator system is added to the emulsion. On reaching the desired polymerization temperature, the remainder of the main and auxiliary co-monomers and the remainder of the initiator system are added gradually to the stirred emulsion. After addition of the monomers and initiator are complete, the temperature of the emulsion may be raised to a higher temperature and then maintained at this temperature, for example for about 60 to 360 minutes, to complete polymerization. The present polymerization process may or may not normally be conducted in the presence of a seed latex.

On completion of the polymerization, a further chemical after-treatment, especially with redox catalysts, for example combinations of the abovementioned oxidizing agents and reducing agents, may follow to reduce the level of residual unreacted monomer on the product. In addition, residual monomer can be removed in a known manner, for example by physical demonomerization, e.g., distillative removal, especially by means of steam distillation, or by stripping with an inert gas. A particularly efficient combination is one of physical and chemical methods, which permits lowering of the residual monomers to very low contents (<1000 ppm, for example, <100 ppm). Further, following completion of emulsion polymerization, the resulting copolymer dispersion may be neutralized.

Coating Compositions

The actual paper coating compositions of the invention comprise the copolymer dispersion, described above, optionally together with pigments, such as, for example, one or more of (kaolin) clay, titanium dioxide and/or calcium carbonate, talkum, and the usual paper coating additives, which may include, for example, rheology modifiers such as CMC (carboxymethyl cellulose), sodium polyacrylates or sodium alginates; lubricants; cross-linkers; optical brighteners; biocides; dispersants; or other co-binders, such as polyvinyl alcohol, protein, e.g., casein or soy protein, or starch, as is well known to those skilled in the art. The coating compositions herein may also contain sufficient alkali to maintain the pH of the coating composition between 6 and 10, for example, between 7 and 9.

Thus, in one embodiment, the invention is to a coating composition, for example, a paint, paper or paperboard coating composition, comprising an aqueous surfactant-stabilized, copolymer latex binder, and sufficient alkali to achieve a pH of 6 to 10, the latex binder having dispersed therein a copolymer of a vinyl ester of an alkanoic acid having from 1 to 13 carbon atoms, ethylene, from 0.5 to 5 pphm of a first cross-linking co-monomer comprising an ethylenically unsaturated monomer comprising an epoxy group, and from 0.55 to 2 pphm of a second functional co-monomer comprising an ethylenically unsaturated dicarboxylic acid, mono- or di-ester thereof or anhydride thereof. The copolymer is dispersed in an aqueous medium comprising a stabilizer, preferably a surfactant stabilizer. The coating composition preferably further comprises one or more pigments. The latex binder may be substantially free of alkylphenol ethoxylate surfactants and protective colloids such as polyvinyl alcohol, as described above. In other embodiments, protective colloids such as polyvinyl alcohol or hydroxyethyl cellulose may be included as a stabilizer.

The pigment used in coating compositions herein may be any of those conventionally employed. Frequently, some or all of the pigment comprises clay and for this portion any of the clays customarily used for paper coating, including the hydrous aluminum silicates of kaolin group clays, hydrated silica clays, and the specific types of clays recommended in Chapters 10-16 of "Kaolin Clays and their Industrial Uses," by J. M. Huber Corp. (1949), New York, N.Y. may be employed. The coating composition may further comprise a pigment selected from the group consisting of clay, calcium carbonate, titanium dioxide, plastic pigments and combinations thereof.

In addition to clay itself, or as a complete replacement for clay, optical brighteners and/or paper pigments may also be utilized, such as, for example, calcium carbonate, titanium dioxide, or other coating pigments including plastic pigments, for example, polystyrene. The pigments, in particular calcium carbonate, may be present, for example, in amounts up to 50 wt. %, up to 75 wt. % or up to 97 wt. %, based on the total weight of the coating composition. Additionally, the composition may also contain other additives such as zinc oxide and/or a small amount of a dispersing or stabilizing agent such as sodium polyacrylate or tetrasodium polyphosphate (TSPP). The amount of binder (dispersion) in the paper coating composition may vary, but can range from 2.5 to 25 parts per 100 parts dry pigment, e.g., from 3.5 to 18 parts per 100 parts dry pigment.

The paper coating compositions of the invention may be applied to various substrates including paper such as freesheet and groundwood grades; paper board; labels; paper products used for newspapers, advertisements, poster, books or magazines; and building substrates such as wall paper, wall board, or ceiling tile. In one embodiment, the paper coating composition can be used to coat paper intended for rotogravure printing.

The amount of the paper coating composition applied to the substrate is generally in the range of about 1 to 40 g/m$^2$, for example, in the range of 3 to 12 g/m$^2$ or 15 to 25 g/m$^2$. The paper coating composition may be applied in a single step or by using two or more steps to build the final coat weight. Further, the paper coating composition may also be applied to the second side of the substrate either simultaneously or as a separate coating step.

The paper coating composition may be applied to the substrate by techniques well known to those in the art. For example, the paper coating composition may be applied with a roll applicator such as a metered size press; a blade coater such as a short dwell time applicator; air knife coater; slot die coater; jet applicator; curtain coater or brush. Coating methods for high speed application include the use of a blade coater, a metered size press or a film press.

The paper coating compositions of the present invention, which contain the particular copolymer dispersions described above, provide highly desirable binding characteristics when applied as coating to paper substrates of the type described above. The binding performance can be quantified by IGT dry and wet pick values, as described above. In preferred embodiments, the coating composition has an IGT Dry Pick Value of at least 70, at least 100, at least 150, at least 160 or at least 170. In terms of ranges, the IGT dry pick value optionally ranges from 70 to 200, e.g., from 90 to 180, from 110 to 160, from 70 to 100, from 100 to 130 or from 130 to 150, from 150 to 170, or from 170 to 200 cm/s.

Since pick strength values may vary based on the substrate used, pick strength may also be characterized relative to a control. As used herein, "% IGT" and "% dry IGT" refer to such values relative to control based on a similarly formed copolymer, but without the first and second co-monomers. In various embodiments of the invention, the coating compositions of the invention may provide a % IGT dry pick value greater than 100%, greater than 150% or greater than 230%, relative to a similarly formed copolymer, but without the first and second co-monomers. For example, Sample H in the Examples, discussed below, could serve as a control for a similar copolymer formed from vinyl acetate, ethylene and the first and second co-monomers.

In offset printing, the use of water in addition to ink may lead to printing complications. For example, water may weaken the paper surface causing paper particles to be pulled off from the surface by the tack of the ink. This is referred to as wet pick. Water on the paper may also cause the paper to not accept ink due to the fact that the water did not completely penetrate into the paper. This is referred to as wet repellence. Wet pick and wet repellence may be ascertained as described in IGT Information leaflet W32, July 2002, published by IGT Testing Systems b.v., the entirety of which is incorporated herein by reference. The coating compositions may provide IGT Wet Pick Values less than 60, less than 30, less than 10, less than 7 or about 0, and wet repellence values less than 30, e.g., less than 10 or less than 0.

Depending on the formulation employed, the binder and paper-coating compositions of the present invention may or may not comply with U.S. Food & Drug Administration (FDA) regulations concerning paper products that can be used in contact with food. In particular, FDA regulations embodied in 21 CFR §176.170 and 21 CFR §176.180 indicate the types of paper coating composition components, including components of polymers used in such compositions, which can be utilized to coat paper for eventual use with food products.

EXAMPLES

The copolymer dispersions of the present invention, and the performance of such dispersions in the paper coating compositions herein, are illustrated by way of the following non-limiting Examples.

Aqueous Binder Latex Emulsion Preparation

Sample A was prepared in a process without pre-emulsion. In particular, in 22376 g of demineralized water, 2717 g of a 15% active solution of sodium lauryl sulfate, 987 g of a 30% active solution of sodium vinyl sulfonate, 19 g of sodium bisulfite and 62 g of sodium acetate were dissolved.

To the reactor was added at room temperature 9226 g of vinyl acetate, 312 g of glycidyl methacrylate and 2268 g of ethylene resulting in a pressure of 40 Bar. The mixture was heated to 72° C. When the temperature reached 70° C., 1774 g of a 6.7% solution of sodium persulfate was slowly added over a period of 330 minutes.

After the start of the polymerization, another 2268 g of ethylene was added while maintaining the pressure in the reactor at 40 Bar. A monomer mixture containing 19163 g of vinyl acetate & 647 g of glycidyl methacrylate was added during a period of 300 minutes. Twenty five minutes after the start of the monomer mixture addition, 3836 g of an 8.3% solution of itaconic acid was slowly added during 270 minutes. After all additions were finished the temperature was held at 72° C. for another 30 minutes.

The resulting emulsion had a solids content of 52.2%, a viscosity of 734 mPa·s and the pH was neutralized by addition of a 4% solution of ammonium hydroxide. The vinyl acetate/ethylene copolymer formed in the emulsion comprised 14.2 pphm of ethylene, 3 pphm of glycidyl methacrylate and 1 pphm of itaconic acid as co-monomers.

Samples B and C and Comparative Samples G and H were similarly prepared in a process without pre-emulsion using the same general procedures as those used in the preparation of Sample A, though with varying amounts of itaconic acid and glycidyl methacrylate.

Sample D was prepared in a process with pre-emulsion. In particular, in 20157 g of demineralized water, 2698 g of a 15% active solution of sodium lauryl sulfate, 980 g of a 30% active solution of sodium vinyl sulfonate, 18.4 g of sodium bisulfite and 61 g of sodium acetate were dissolved.

To the reactor was added at room temperature 9523 g of vinyl acetate and 3174 g of ethylene resulting in a pressure of 65 Bar. The mixture was heated to 72° C. When the temperature reached 70° C., 1762 g of a 7.1% solution of sodium persulfate was slowly added over a period of 250 minutes.

Fifteen minutes after the start of the polymerization, a monomer pre-emulsion was also added to the mixture over a period of 220 minutes. The pre-emulsion was made by emulsifying 19046 g of vinyl acetate and 952 g of glycidyl methacrylate in a solution of 317 g of itaconic acid and 293 g of a 65% active solution of fatty alcohol ethoxylates (30EO) in 5714 g of demineralized water. After all additions were finished the temperature was held at 72° C. for another 30 minutes.

The resulting emulsion had a solids content of 51.8%, a viscosity of 270 mPa·s and the pH was neutralized by addition of a 4% solution of ammonium hydroxide. The vinyl acetate/ethylene copolymer formed in the emulsion comprised 10 part per hundred monomer of ethylene, 3 part per hundred monomer of glycidyl methacrylate and 1 part per hundred monomer of itaconic acid as co-monomers.

Sample E was prepared by a process with pre-emulsion. In particular, in 19432 g of demineralized water, 2686 g of a 15% active solution of sodium lauryl sulfate, 975 g of a 30% active solution of sodium vinyl sulfonate, 1.3 g of ferrous sulfate heptahydrate, 61 g of sodium acetate and 131 g of a 3.8% solution of Bruggolite® FF6 were dissolved. A small amount of phosphoric acid was added to adjust the pH to approximately 5.

To the reactor was added at room temperature 9479 g of vinyl acetate and 3160 g of ethylene resulting in a pressure of 45 Bar. The mixture was heated to 60° C. When the temperature reached 58° C., 1390 g of a 10% solution of sodium persulfate and 1180 g of a 3.8% solution of Bruggolite FF6 was slowly added in parallel over a period of 250 minutes. The reactor temperature was controlled at 72° C.

Fifteen minutes after the start of the polymerization, a monomer pre-emulsion was also added to the mixture over a period of 220 minutes. Such a pre-emulsion was made by emulsifying 18958 g of vinyl acetate and 948 g of glycidyl methacrylate in a solution of 316 g of itaconic acid and 292 g of a 65% active solution of fatty alcohol ethoxylates (30EO) in 5687 g of demineralized water. After all additions were finished the temperature was held at 72° C. for another 30 minutes.

The resulting emulsion had a solids content of 51.6%, a viscosity of 390 mPa·s and the pH was neutralized by addition of a 4% solution of ammonium hydroxide. The vinyl acetate/ethylene copolymer formed in the emulsion comprised 10 part per hundred monomer of ethylene, 3 part per hundred monomer of glycidyl methacrylate and 1 part per hundred monomer of itaconic acid as co-monomers.

Sample F was prepared in a process without pre-emulsion. In particular, in 21725 g of demineralized water, 2696 g of a 15% active solution of sodium lauryl sulfate, 979 g of a 30% active solution of sodium vinyl sulfonate, 1.3 g of ferrous sulfate heptahydrate, 61 g of sodium acetate and 136 g of a 7% solution of Bruggolite FF6 were dissolved. A small amount of phosphoric acid was added to adjust the pH to approximately 5.

To the reactor was added at room temperature 9515 g of vinyl acetate and 3172 g of ethylene resulting in a pressure of 47 Bar. The mixture was heated to 60° C. When the temperature reached 58° C., 1395 g of a 10% solution of sodium persulfate and 1227 g of a 7% solution of Bruggolite FF6 were slowly added in parallel over a period of 250 minutes. The reactor temperature was controlled at 72° C.

After the start of the polymerization, a monomer mixture containing 19029 g of vinyl acetate and 951 g of glycidyl methacrylate was added during a period 220 minutes. Fifteen minutes after the start of monomer mixture dosage, 3806 g of a 8.3% solution of itaconic acid were slowly add during 180 minutes. After all additions were finished the temperature was held at 72° C. for another 30 minutes.

The resulting emulsion had a solid content of 49.9%, a viscosity of 206 mPa·s and the pH was neutralized by addition of a 4% solution of ammonium hydroxide. The vinyl acetate/ethylene copolymer formed in the emulsion comprised 10 part per hundred monomer of ethylene, 3 part per hundred monomer of glycidyl methacrylate and 1 part per hundred monomer of itaconic acid as co-monomers.

Comparative Samples I and J were commercial VAE products, Comparative Sample K was commercial SB dispersion product, and Comparative Sample L was a formulated poly(styrene butylacrylate) product. Samples A-F are detailed in Table 1 and Comparative Samples G-L are detailed in Table 2, each of which includes emulsion properties and analytical data of the samples. Functional monomers other than glycidyl methacrylate (GMA), itaconic acid, and acrylic acid are not specified in Table 1 and Table 2.

TABLE 1

| Sample | A | B | C | D | E | F |
|---|---|---|---|---|---|---|
| VAE:Ethylene Molar Ratio | 6:1 | 6:1 | 6:1 | 9:1 | 9:1 | 9:1 |
| GMA Content (pphm) | 3 | 1.6 | 1.6 | 3 | 3 | 3 |
| Itaconic Acid Content (pphm) | 1 | 1 | 0.75 | 1 | 1 | 1 |
| Solids Content (%) | 52.2 | 51.5 | 51 | 51.8 | 51.6 | 49.9 |
| pH | 6.8 | 6.9 | 7.0 | 7.0 | 7.0 | 6.9 |
| Viscosity (mPas) | 734 | 620 | 814 | 270 | 390 | 206 |
| Particle Size (nm) | 142 | 133 | 131 | 160 | 143 | 163 |
| $T_g$ (° C.) | 12.1 | 13.1 | 12.6 | 20.6 | 22.9 | 19.0 |

TABLE 2

| Sample | Comp. G VAE* | Comp. H VAE* | Comp. I Commercial VAE | Comp. J Commercial VAE | Comp. K Commercial SB Dispersion | Comp. L Poly (styrene butyl acrylate) |
|---|---|---|---|---|---|---|
| GMA Content (pphm) | 0 | 3 | 0 | 1.6 | — | — |
| Itaconic Acid Content (pphm) | 1 | 0 | 0 | 0.52 | — | — |
| Solid Content (%) | 51 | 51.9 | 50 | 53.5 | 50 | 51 |
| pH | 6.3 | 6.2 | 6.6 | 6.2 | 6.4 | 8 |
| Viscosity (mPas) | 468 | 1712 | 30 | 100 | 722 | 1682 |
| Particle Size (nm) | 135 | 121 | 148 | 223 | 126 | 116 |
| $T_g$ (° C.) | 9.4 | 10.4 | 0 | 8.1 | −1 | 11 |

*6:1 vinyl acetate:ethylene molar ratio

Paper Coating Composition Formulations

Paper coating compositions were formulated comprising latex Samples A-F and latex Comparative Samples G-L, as detailed in Table 3. The formulations were modified by water addition to a target solids content of 68 wt. %.

TABLE 3

| Dry Parts | Ingredient | Ingredient Solid level (%) |
|---|---|---|
| 70 | Calcium Carbonate | 78 |
| 30 | Kaolin Clay | 71.9 |
| 7 | Latex | 50 |
| 0.5 | Lubricant (Calcium stearate) | 50 |
| 0.1 | Rheology Modifier (Carboxyl methyl cellulose) | 10 |
| — | Water | 0 |
| 107.6 | Total dry | |

Testing Parameters

The formulated paper coating compositions were tested for IGT Pick Strength. The testing parameters employed for these tests are provided below. IGT picking data was then obtained for each sample. Results can be found in Tables 4 and 5.

TABLE 4

| Sample | A | B | C | D | E | F |
|---|---|---|---|---|---|---|
| IGT Dry pick (cm/s) | 165 | 127.7 | 128.4 | 165.9 | 154.3 | 159.3 |
| IGT Wet pick (%) | 4 | 18 | 12 | 6 | 7 | 0 |
| IGT Wet repellence (%) | 24.9 | 21.9 | 17.7 | 28.0 | 27.6 | 33.8 |

TABLE 5

| Sample | Comp. G | Comp. H | Comp. I | Comp. J | Comp. K | Comp. L |
|---|---|---|---|---|---|---|
| IGT Dry pick | 148.2 | 141 | 71.3 | 116.6 | 162.3 | 167.9 |

TABLE 5-continued

| Sample | Comp. G | Comp. H | Comp. I | Comp. J | Comp. K | Comp. L |
|---|---|---|---|---|---|---|
| IGT Wet pick, (%) | 97 | 9 | 92 | 79 | 0 | 68 |
| IGT Wet repellence, (%) | 0 | 26.5 | 0 | 0 | 28.1 | 5.5 |

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of the patentable novelty which reside in the present disclosure, including all features which would be treated as equivalents thereof by those skilled in the art to which the disclosure pertains.

We claim:

1. A copolymer dispersion, comprising:
a copolymer of:
(a) a vinyl ester of an alkanoic acid having from 1 to 13 carbon atoms;
(b) ethylene;
(c) from 0.5 to 5 pphm of a first cross-linking co-monomer comprising an ethylenically unsaturated monomer comprising an epoxy group; and
(d) from 0.55 to 2 pphm of a second functional co-monomer comprising itaconic acid, a mono- or di-ester thereof, or an anhydride thereof;
wherein the copolymer is dispersed in an aqueous medium comprising a stabilizer.

2. The dispersion of claim 1, wherein the first cross-linking co-monomer is selected from the group consisting of allyl glycidyl ether, methacryloyl glycidyl ether, butadiene monoepoxides, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxypropyl)acrylamide, N-(2,3-epoxypropyl)methacrylamide, 4-acrylamidophenyl glycidyl ether, 4-methacrylamidophenyl glycidyl ether, 3-acrylamidophenyl glycidyl ether, 3-methacrylamidophenyl glycidyl ether, N-glycidyloxymethylacrylamide, N-glycidyloxypropylmethacrylamide, N-glycidyloxyethylacrylamide, N-glycidyloxyethylmethacrylamide, N-glycidyloxypropylacrylamide, N-glycidyloxypropylmethacrylamide, N-glycidyloxybutylacrylamide, N-glycidyloxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl(2,3-epoxypropyl)ammonium chloride, and methacrylamidopropyldimethyl(2,3-epoxypropyl)ammonium chloride.

3. The dispersion of claim 1, wherein the first cross-linking co-monomer comprises glycidyl methacrylate.

4. The dispersion of claim 1, wherein the copolymer comprises from 2 to 4 pphm of the first cross-linking co-monomer.

5. The dispersion of claim 1, wherein the copolymer comprises from 0.75 to 1.25 pphm of the second functional co-monomer.

6. The dispersion of claim 1, wherein the vinyl ester of the alkanoic acid having from 1 to 13 carbon atoms comprises vinyl acetate.

7. The dispersion of claim 1, wherein the copolymer comprises from 70 to 95 pphm vinyl acetate and from 5 to 30 pphm of ethylene.

8. The dispersion of claim 1, wherein said stabilizer comprises a surfactant stabilizer.

9. The dispersion of claim 8, wherein said surfactant stabilizer is selected from the group consisting of sodium dodecylbenzene sulfonate, sodium butylnaphthalene sulfonate, disodium dodecyl diphenyl ether disulfonate, N-octadecyl sulfosuccinate, dioctyl sodiumsulfosuccinate, and combinations thereof.

10. The dispersion of claim 8, wherein said surfactant stabilizer comprises sodium lauryl sulfate.

11. The dispersion of claim 8, wherein said stabilizer further comprises a functionalizing co-monomer.

12. The dispersion of claim 1, wherein said stabilizer comprises a functionalizing co-monomer.

13. The dispersion of claim 12, wherein said functionalizing co-monomer comprises sodium vinyl sulfonate.

14. The dispersion of claim 1, wherein said stabilizer comprises one or more colloidal stabilizers.

15. The dispersion of claim 14, wherein said stabilizer further comprises one or more surfactant stabilizers.

16. A paper coating composition, comprising:
the copolymer dispersion of claim 1; and
one or more pigments.

17. The coating composition of claim 16, wherein said pigment is selected from the group consisting of clay, calcium carbonate, titanium dioxide, talcum, plastic pigments and combinations thereof.

18. A paper or paperboard substrate coated with from about 1 to 40 $g/m^2$ of the coating composition of claim 16.

19. The paper or paperboard substrate of claim 18, having a dry IGT value greater than 160 cm/s.

20. The paper or paperboard substrate of claim 18, having a % dry IGT value greater than 230%.

21. The paper or paperboard substrate of claim 18, having a wet IGT value less than 7.

22. A copolymer dispersion, comprising:
a copolymer of:
(a) a vinyl ester of an alkanoic acid having from 1 to 13 carbon atoms;
(b) ethylene;
(c) from 1.7 to 5 pphm of a first cross-linking co-monomer comprising an ethylenically unsaturated monomer comprising an epoxy group; and
(d) from 0.1 to 2 pphm of a second functional co-monomer comprising itaconic acid, a mono- or di-ester thereof, or an anhydride thereof;
wherein the copolymer is dispersed in an aqueous medium comprising a stabilizer.

23. The dispersion of claim 22, wherein the copolymer comprises from 2 to 4 pphm of the first cross-linking co-monomer.

24. The dispersion of claim 22, wherein the copolymer comprises from 0.75 to 1.25 pphm of the second functional co-monomer.

25. A process of producing a copolymer dispersion according to claim 22, the process comprising:
(a) providing an aqueous mixture comprising monomers (a)-(d) and stabilizer; and
(b) emulsion polymerizing the monomers in the aqueous mixture.

26. A copolymer dispersion, comprising:
a copolymer of:
(a) a vinyl ester of an alkanoic acid having from 1 to 13 carbon atoms;

(b) ethylene;
(c) a first cross-linking co-monomer comprising an ethylenically unsaturated monomer comprising an epoxy group; and
(d) a second functional co-monomer comprising an ethylenically unsaturated dicarboxylic acid, mono- or di-ester thereof or anhydride thereof;
wherein the copolymer is dispersed in an aqueous medium comprising a stabilizer; and
wherein the copolymer has an average particle size greater than 80 nm and less than 260 nm, optionally greater than 80 nm and less than 220 nm.

27. A process of producing a copolymer dispersion, the process comprising:
(a) providing an aqueous mixture comprising:
(i) a vinyl ester of an alkanoic acid having from 1 to 13 carbon atoms;
(ii) ethylene;
(iii) a first cross-linking co-monomer comprising an ethylenically unsaturated monomer comprising an epoxy group; and
(iv) a second functional co-monomer comprising itaconic acid, a mono- or di-ester thereof, or an anhydride thereof;
wherein the first cross-linking co-monomer is present in an amount from 0.5 to 5 pphm and the second functional co-monomer is present in an amount from 0.55 to 2 pphm, or the first cross-linking co-monomer is present in an amount from 1.7 to 5 pphm and the second functional co-monomer is present in an amount from 0.1 to 2 pphm; and
(v) stabilizer; and
(b) emulsion polymerizing the aqueous mixture.

28. The process of claim 27, wherein the one or more of the vinyl ester, ethylene, first cross-linking co-monomer and/or second functional co-monomer are added periodically to a reaction vessel to form the aqueous mixture.

29. The process of claim 27, wherein an initial charge comprising the vinyl ester, ethylene and the first cross-linking co-monomer is followed by subsequent addition of the second functional co-monomer, and optionally subsequent addition of additional vinyl ester, additional ethylene and/or additional first cross-linking co-monomer.

* * * * *